United States Patent [19]

Wise

[11] Patent Number: 4,565,503

[45] Date of Patent: Jan. 21, 1986

[54] DEVICE FOR COOLING MOTOR END-TURNS IN A COMPRESSOR

[75] Inventor: Kennard L. Wise, Tecumseh, Mich.

[73] Assignee: Tecumseh Products Company, Tecumseh, Mich.

[21] Appl. No.: 706,596

[22] Filed: Feb. 28, 1985

Related U.S. Application Data

[63] Continuation of Ser. No. 433,824, Oct. 12, 1982, abandoned.

[51] Int. Cl.[4] .................. F04B 39/02; H02K 9/00; F01M 1/06
[52] U.S. Cl. .................. 417/372; 417/902; 310/54; 184/6.16; 184/6.18
[58] Field of Search ............ 417/902, 366, 368, 369, 417/370, 372; 184/6.16, 6.18; 310/54, 59

[56] References Cited

U.S. PATENT DOCUMENTS

| 1,921,842 | 8/1933 | Rushton . | |
|---|---|---|---|
| 2,500,751 | 3/1950 | Halfvarson . | |
| 2,883,101 | 4/1959 | Kosfeld . | |
| 3,182,901 | 5/1965 | Solomon . | |
| 3,445,695 | 5/1969 | Schultz | 310/54 |
| 3,560,116 | 2/1971 | Valbjorn et al. . | |
| 3,618,337 | 11/1971 | Mount | 417/366 X |
| 3,664,461 | 5/1972 | Leffers et al. | 184/6.16 |
| 3,692,435 | 9/1972 | Iida et al. . | |
| 4,097,185 | 6/1978 | Wolf . | |
| 4,127,994 | 12/1978 | Niven . | |
| 4,140,441 | 2/1979 | Patterson . | |
| 4,209,080 | 6/1980 | Douglas . | |
| 4,236,879 | 12/1980 | Abe . | |

FOREIGN PATENT DOCUMENTS

| 1501139 | 5/1966 | Fed. Rep. of Germany . | |
|---|---|---|---|
| 1219955 | 1/1967 | Fed. Rep. of Germany . | |
| 2930259 | 7/1979 | Fed. Rep. of Germany . | |
| 3128385 | 7/1981 | Fed. Rep. of Germany . | |
| 0125376 | 9/1980 | Japan | 417/368 |
| 894176 | 12/1960 | United Kingdom . | |
| 2029505 | 7/1979 | United Kingdom . | |
| 840464 | 6/1981 | U.S.S.R. . | |

Primary Examiner—Carlton R. Croyle
Assistant Examiner—Theodore Olds
Attorney, Agent, or Firm—Albert L. Jeffers; Anthony Niewyk

[57] ABSTRACT

A cooling device for a hermetic motor-compressor unit having an outer housing with a lubricant sump in the bottom thereof, a rotatable crankshaft vertically disposed in the housing, and a motor having a stator circumferentially disposed about the rotating crankshaft and a rotor connected to the crankshaft for rotation therewith. The cooling device comprises a pick-up tube connected to the rotating crankshaft and having one end thereof extending into the lubricant sump. The pick-up tube has an axial bore disposed therein and a radial passage means disposed therein in communication with the axial bore so that, upon rotation of the crankshaft, oil is pumped upwardly through the axial bore and a portion thereof thrown radially outwardly through the radial passage means and directly against the inner surfaces of the lower end turns of the stator without having first contacted any other parts of the motor.

6 Claims, 1 Drawing Figure

U.S. Patent  Jan. 21, 1986  4,565,503
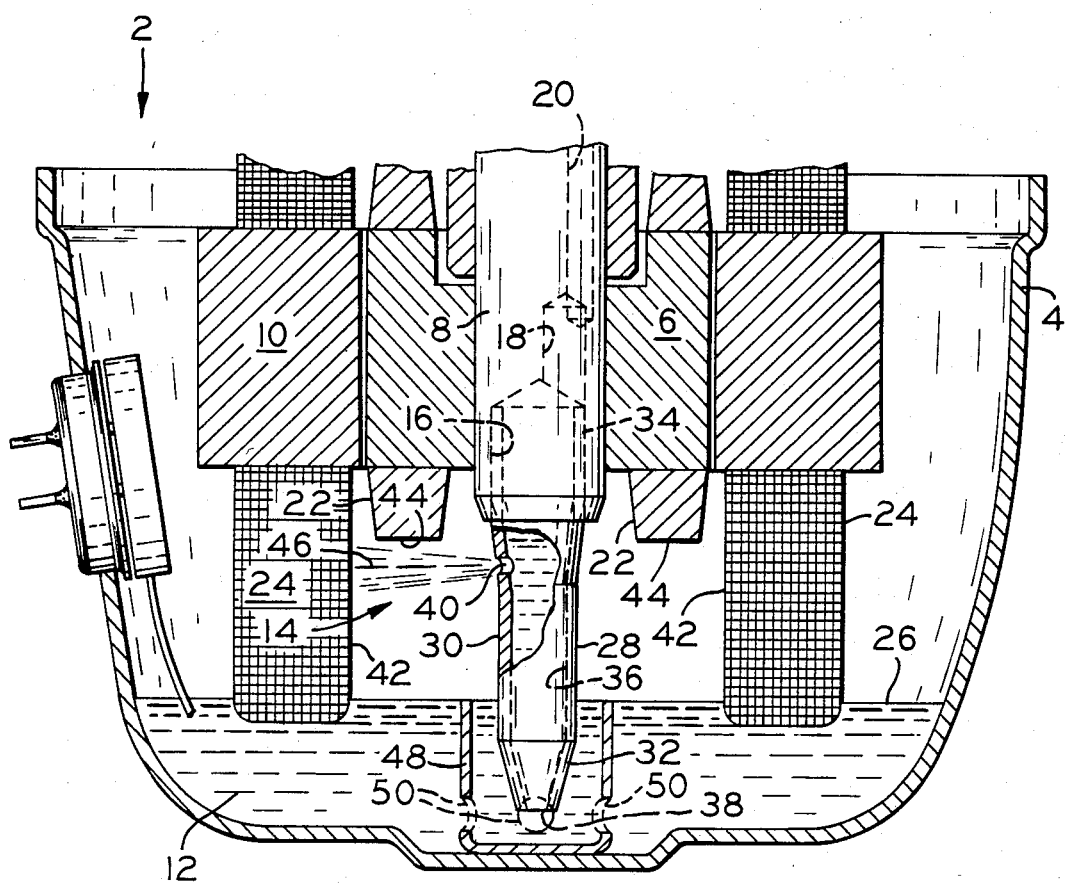

DEVICE FOR COOLING MOTOR END-TURNS IN A COMPRESSOR

This is a continuation of application Ser. No. 433,824, filed Oct. 12, 1982, and now abandoned.

BACKGROUND OF THE INVENTION

This invention pertains to a cooling device for a hermetic motor-compressor unit, and more particularly to a cooling device that radially sprays a portion of the lubricant pumped by a lubricant pick-up tube directly against the lower end turns of the motor stator.

One problem of major concern relating to hermetic motor-compressor units is the heat generated by its operation which decreases compressor cooling efficiency. Various devices have been arranged within the housing of the motor-compressor unit to pump lubricant from an oil sump therein onto or against different structural members to reduce their temperatures caused by the heat generated by the unit's operation. An example of one such device is disclosed in U.S. Pat. No. 3,618,337 wherein a portion of the pumped lubricant is used to cool the lower end ring of the rotor and thereafter the lower end turns of the stator. In particular, oil flows from the oil sump up through an oil pick-up tube into a chamber, which is formed by the inner surfaces of the rotor end ring, a radially disposed flange of the pick-up tube, and the rotating crankshaft. Passages are radially provided in the rotor end ring so that the oil within the chamber may pass therethrough and be dispersed against the stator lower end turns for the cooling thereof. However, since the lubricant must first pass through passages in the rotor end rings before contacting the stator lower end turns, the cooling experienced by the stator lower end turns is reduced because of the increase in temperature of the lubricant as it passes through the radial passages removing heat energy from the rotor end ring.

A further disadvantage of the device disclosed in U.S. Pat. No. 3,618,337 is the increase in cost resulting from the structure defining the oil chamber, i.e., the rotor end ring, the radially disposed flange of the pick-up tube, and the fastener assemblies required to attach the radial flange to the rotor end ring lower surfaces, and the drilling of a plurality of radial passages in the rotor end ring.

Another prior art device similar to the above-mentioned prior art device is disclosed in U.S. Pat. No. 3,560,116 wherein oil is delivered by a pump into two streams, one stream being used for normal lubricating purposes associated with the parts disposed in the upper housing area, and a second stream for cooling the motor parts directly. The two streams of oil are created by two oil pump pick-up tubes, an inner tube and an outer tube, wherein the outer tube pumps lubricant upwardly through the area defined between the inner and outer tube into a chamber defined by the rotor lower short-circuiting ring, a flange radially disposed on the top portion of the outer tube, and the inner tube which extends upwardly to the rotating crankshaft. The radial flange has depressed grooves radially disposed therein and with the lower surface of the lower short-circuiting ring form radial passages for delivering a portion of the lubricant therethrough against the stator lower coil ends. Any cooling experienced by the stator lower coil ends is reduced since the oil being sprayed thereon has absorbed heat energy from the radial flange, inner pick-up tube, and the rotor lower short-circuiting ring. As with the prior art cooling device disclosed in the above U.S. Pat. No. 3,618,337, the temperature of the rotor is generally higher than the temperature of the stator, thereby further reducing any cooling effect of the oil against the stator lower coil ends.

Further, the cooling device in U.S. Pat. No. 3,560,116 undesirably increases the cost of the compressor because of its rather complex construction requiring two coaxially disposed pick-up tubes, the radial flange disposed on the upper portion of the outer pick-up tube, and the depressed grooves disposed within the radial flange.

SUMMARY OF THE INVENTION

The cooling device of the present invention eliminates the disadvantages and problems discussed in the above prior art by providing a lubricant pick-up tube having a hole radially disposed therein. The hole is axially located on the lubricant pick-up tube such that the oil thrown radially outwardly therethrough avoids contact with other motor parts during its flight to and directly against the radially inner surfaces of the stator lower end turns. Since the oil thrown radially outwardly through the hole is pumped directly by the lubricant pick-up tube from the oil sump, that portion of the oil maintains a substantially constant temperature so as to provide maximum cooling to the stator lower end turns. Since this portion of the pumped oil does not first contact any other motor components prior to contacting the stator lower end turns, the stator cooling effectuated by that portion of the pumped oil is greater than the cooling resulting from the above prior art cooling devices.

In further contrast with the above prior art cooling devices, the cooling device of the present invention is substantially less costly to construct since it does not involve additional structural members, for example, radially extending flanges from the upper portion of the pick-up tube, depressed grooves within the radial flange, or a plurality of coaxially disposed pick-up tubes.

A further advantage of the cooling device of the present invention is that it reduces the requirement for close tolerances of the stator lower end turns by throwing the oil directly on the end turns, which makes submersion of the end turns in the oil less critical in controlling motor temperatures as may be the case in some prior art compressors.

In one embodiment of the present invention, there is provided in a hermetic motor-compressor unit a cooling device comprising a lubricant pick-up tube having one end connected to a rotating crankshaft and its opposite end extending into an oil sump disposed in the housing of the motor-compressor unit. The pick-up tube has an axial bore upwardly extending therein from its opposite end and through which oil from the oil sump is pumped. The motor stator has its lower end turns extending downwardly such that their radially inner surfaces are in radially adjacent and spaced-apart relationship with the pick-up tube. The pick-up tube further has a radial passage means disposed therein which communicates with the axial bore and which is in direct facing relationship with the stator lower end turns. As the lubricant-pick-up tube is rotated, a portion of the lubricant pumped upwardly through the axial bore is thrown radially outwardly through the radial passage means directly against the radially inner surfaces of the stator lower end turns prior to contacting any other portion of the motor unit.

It is an object of the present invention to provide an improved cooling device for a hermetic motor-compressor unit which transports a portion of the oil from the oil sump upwardly through a lubricant pick-up tube and directly against the radially inner surfaces of the stator lower end turns prior to contacting and drawing heat from any other motor components.

Another object of the present invention is to provide an improved cooling device for the stator lower end turns in a hermetic motor-compressor unit which is inexpensive to manufacture.

BRIEF DESCRIPTION OF THE DRAWING

The above mentioned and other features and objects of this invention, and the manner of attaining them, will become more apparent and the invention itself will be better understood by reference to the description of an embodiment of the invention taken in conjunction with the drawing, which is a longitudinal sectional view of the lower portion of a hermetic motor-compressor unit incorporating a preferred embodiment of the present invention.

DESCRIPTION OF A PREFERRED EMBODIMENT

Referring to the drawing, lower portion 2 of a hermetic motor-compressor unit is illustrated comprising a compressor outer housing 4 enclosing rotor 6 which is secured to crankshaft 8 to rotate therewith, stator 10 which is secured within housing 4, oil sump 12 disposed in the lower portion of outer housing 4, and cooling device 14 of the present invention.

Crankshaft 8 is conventionally mounted within motor compressor unit 2 and has axially disposed therein a plurality of passages 16, 18 and 20 for delivering oil to the upper components of motor compressor unit 2. The portion of oil delivered upwardly through passages 16, 18 and 20 generally returns to oil sump 12 by gravitational means.

Rotor 6 has rotor end rings 22, and stator 10 has stator motor end turns 24 extending downwardly in outer housing 4 so that the lower end portions of end turns 24 may be disposed below oil level 26 in oil sump 12.

Cooling device 14 comprises pickup tube 28, which has a generally cylindrical midportion 30 a lower conical portion 32 joined to midportion 30 and an upper portion 34 disposed within passage 16 of crankshaft 8. As illustrated, pickup tube 28 has axial bore 36 disposed therein and which communicates with passage 16 of crankshaft 8. The lower end of axial bore 36 defines opening 38 in conical portion 32, which is disposed below oil level 26.

Radially disposed within pickup tube 28 is hole 40 through which a portion of the pumped lubricant is thrown radially outwardly. Important to cooling device 14 is the axial location of hole 40 in pickup tube 28. Hole 40 is disposed within pickup tube 28 so that it is directly opposite the radially inner surfaces 42 of stator end turns 24 and below lower surfaces 44 of rotor end rings 22. By so positioning hole 40 in pickup tube 28 there are no obstructions to the oil spray 46 exiting hole 40 and being thrown directly against radially inner surfaces 42 of stator end turns 24.

An enclosure 48 is secured to the bottom portion of outer housing 4 in coaxial, spaced-apart relationship with pickup tube 28 to reduce the effects of cavitation. Enclosure 48 is provided with a plurality of holes 50 so that oil in oil sump 12 may pass therethrough and within enclosure 48.

In operation, crankshaft 8 is rotated upon actuation of motor-compressor unit 2 and rotates pickup tube 28 within enclosure 48. Oil within oil sump 12 is then drawn upwardly through axial bore 36 wherein a portion is delivered further upwardly through passages 16, 18 and 20 for lubrication of compressor components in the upper portion of motor compressor unit 2. The remainder of the oil pumped upwardly through axial bore 36 is thrown radially outwardly through hole 40 and directly against radially inner surfaces 42 of stator end turns 24, and since hole 40 is below the lower surfaces 44 of ring 22, oil spray 46 avoids contacting any motor-compressor unit parts prior to contacting inner surfaces 42 of stator end turns 24. This substantially eliminates any potential temperature increase of oil spray 46, which would decrease the cooling of stator end turns 24 by cooling device 14.

While this invention has been described as having a specific embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. In a hermetic motor-compressor unit including an outer housing having a lubricant sump in the bottom thereof, a rotatable crankshaft vertically disposed in said housing, and a motor having a stator circumferentially disposed about said rotating crankshaft and a rotor connected to said rotating crankshaft for rotation thereof, a cooling device comprising:

a centrifugal lubricant pick-up tube having one end directly attached to said rotating crankshaft for rotation therewith and its opposite end extending vertically into said lubricant sump, said pick-up tube including an axial bore extending upwardly therein from said opposite end and a pump means for pumping lubricant upwardly from said sump, said stator having lower end turns extending downwardly in said outer housing, said lower end turns having their radially inner surfaces in radially adjacent and spaced-apart relationship with said pick-up tube, said pick-up tube having a radial passage means therein in communication with said axial bore and in direct facing relationship with said stator lower end turns for throwing a portion of lubricant pumped upwardly through said axial bore radially outwardly therethrough and directly against said radially inner surfaces of said lower end turns for the cooling thereof prior to contacting any other portions of said motor.

2. The unit of claim 1 wherein said lower end turns of said stator have a bottom portion thereof immersed in said lubricant sump.

3. The unit of claim 1 wherein the diameter of said radial passage means is less than the diameter of said axial bore.

4. The unit of claim 1 wherein said radial passage means comprises a hole in said pick-up tube axially below said rotor.

5. In a hermetic motor-compressor unit including an outer housing having a lubricant sump in the bottom thereof, a rotatable crankshaft vertically disposed in said housing, and a motor having a stator circumferentially disposed about said rotating crankshaft and a rotor connected to said rotating crankshaft for rotation thereof, a cooling device comprising:

a centrifugal lubricant pick-up tube having one end directly attached to said rotating crankshaft for rotation therewith and its opposite end extending vertically into said lubricant sump, said pick-up tube having an axial bore extending upwardly therein from said opposite end and including a pump means, said stator having lower end turns extending downwardly in said outer housing, said lower end turns having their radially inner surfaces in radially adjacent and spaced-apart relationship with said pick-up tube, said pick-up tube having a radial passage means therein in a communication with said axial bore and positioned lower than said rotor to be in direct facing relationship with said stator lower ends turns for throwing a portion of lubricant pumped upwardly through said axial bore radially outwardly through said passage means directly against said radially inner surfaces of said lower end turns for the cooling thereof prior to contacting said rotor.

6. In a hermetic motor-compressing unit including an outer housing having a lubricant sump in the bottom thereof, a rotatable crankshaft vertically disposed in said housing and having an axial passage extending through one end thereof, and a motor having a stator circumferentially disposed about said rotating crankshaft and a rotor connected to said rotating crankshaft for rotation thereof, a cooling device comprising:

a tubular member having opposite end portions, one of said end portions being securely fitted into said axial passage of said crankshaft one end for rotation therewith, the other said end portion being generally frusto-conically shaped for drawing oil upwardly and extending vertically into said lubricant sump, said tubular member having an axial bore extending therein from said other end portion, said stator having lower end turns extending downwardly in said outer housing, said lower end turns having their radially inner surfaces in radially adjacent and spaced-apart relationship with said tubular member, said tubular member having an opening radially disposed therein, said opening being in communication with said axial bore and positioned lower than said rotor to be in direct facing relationship with said stator lower end turns for throwing a portion of lubricant pumped upwardly through said axial bore radially outwardly through said opening directly against said radially inner surface of said lower end turns for the cooling thereof prior to contacting said rotor.

* * * * *